(12) United States Patent
Ramirez (10) Patent No.: US 8,189,797 B1
(45) Date of Patent: May 29, 2012

(54) VISUAL REPRESENTATION OF AUDIO DATA

(75) Inventor: Daniel Ramirez, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 1228 days.

(21) Appl. No.: 11/584,077

(22) Filed: Oct. 20, 2006

(51) Int. Cl.
*H04R 29/00* (2006.01)

(52) U.S. Cl. ............... 381/56; 381/306; 381/98; 84/610; 84/666

(58) Field of Classification Search ............ 381/58, 381/56, 57, 320, 306, 310, 98, 102; 345/400.1; 84/610, 609, 615, 625, 649, 650, 653, 660, 84/666; 700/94

See application file for complete search history.

(56) References Cited

U.S. PATENT DOCUMENTS

| | | | | |
|---|---|---|---|---|
| 5,241,302 | A | * | 8/1993 | Thong ........................... 345/589 |
| 5,572,443 | A | * | 11/1996 | Emoto et al. ................... 702/103 |
| 5,874,950 | A | * | 2/1999 | Broussard et al. ............ 715/203 |
| 7,548,791 | B1 | * | 6/2009 | Johnston ......................... 700/94 |

FOREIGN PATENT DOCUMENTS

JP    2003173200 A   *   6/2003

OTHER PUBLICATIONS

"Audio Spectrum Analysis" [online] Visualizations Software, Aug. 2006, [retrieved on Jul. 9, 2007]. Retrieved from the Internet: <URL: http://web.archive.org/web/20060821202448/www.visualizationsoftware.com.gram.html, 3 pages.

'Sound Samples' [online]. Arretec, 1999, [retrieved on Sep. 20, 2006]. Retrieved from the Internet: <URL: www. sto-p.com/aff/samples.htm>, 3 pages.

'Summary of Various TFR Methods Including Using a Spectrogram/STFT as a 2-D Filter for the WVD' [online] Caltech, [retrieved on Sep. 20, 2006]. Retrieved from the Internet: <URL:http://ce.caltech.edu/case/testsignal>, 6 pages.

* cited by examiner

*Primary Examiner* — Vivian Chin
*Assistant Examiner* — Leshui Zhang
(74) *Attorney, Agent, or Firm* — Fish & Richardson P.C.

(57) ABSTRACT

Systems, methods, and computer program products for displaying audio data are provided. In some implementations, a computer-implemented method is provided. The method includes receiving audio data and displaying a composite image representing the audio data. The composite image combines a first representation and a distinct second representation of the audio data. Each representation is visible in the composite image and the representations appear in the composite image as if laid one over the other.

30 Claims, 6 Drawing Sheets

VISUAL REPRESENTATION OF AUDIO DATA

BACKGROUND

This specification relates to displaying visual representations of features of audio data.

Different visual representations of audio data are commonly used to display different features of the audio data. For example, a frequency spectrogram shows a representation of frequencies of the audio data in the time-domain (e.g., a graphical display with time on the x-axis and frequency on the y-axis). Similarly, an amplitude display shows a representation of audio intensity in the time-domain (e.g., a graphical display with time on the x-axis and intensity on the y-axis).

SUMMARY

Systems, methods, and computer program products for displaying audio data are provided. In general, in one aspect, a computer-implemented method is provided. The method includes receiving audio data and displaying a composite image representing the audio data. The composite image combines a first representation and a distinct second representation of the audio data. Each representation is visible in the composite image and the representations appear in the composite image as if laid one over the other.

In general, in one aspect, a computer program product is provided. The computer program product is operable to cause data processing apparatus to perform operations. The operations include receiving audio data and displaying a composite image representing the audio data. The composite image combines a first representation and a distinct second representation of the audio data. Each representation is visible in the composite image and the representations appear in the composite image as if laid one over the other.

Implementations of the method and computer program product can include one or more of the following features. The first and second representations of the audio data can be displayed with respect to a shared axis. The shared axis can be a time axis. The first representation can be a frequency spectrogram. The second representation can represent an amplitude waveform. The amplitude waveform can be represented with a single pixel width line defining the outer shape of the amplitude waveform. The composite image can highlight the region composed of the first and second representations. The method and computer program product can further include editing the audio data. The editing can include receiving an input to perform an editing operation on the audio data and performing the editing operation and updating the displayed audio data to reflect the result of the editing operation.

In general, in one aspect, a system is provided. The system includes a user interface device and one or more computers operable to interact with the user interface device to receive audio data and display a composite image representing the audio data, the composite image combining a first representation and a distinct second representation of the audio data, each representation being visible in the composite image, the representations appearing in the composite image as if laid one over the other.

Implementations of the system can include one or more of the following features. The one or more computers can include a server operable to interact with the user interface device through a data communication network and the user interface device can be operable to interact with the server as a client. The user interface device can include a personal computer running a web browser or a mobile telephone running a WAP browser. The one or more computers can include one personal computer and the personal computer can include the user interface device.

Particular embodiments of the subject matter described in this specification can be implemented to realize one or more of the following advantages. Combining visual representations of audio data allows a user to view different features of audio data without switching between visual representations, either visually between separately positioned visual representations or by switching between displays. Display space for displaying the audio data can be maximized using a single display area instead of having multiple editors displaying distinct visual representations separately on the display. As a result it is easier for the user to identify portions of the audio data for editing including eliminating wasted display space.

The user can easily determine editing parameters using information from more than one visual representation of the audio data. Additionally, the user can identify the effect on a feature shown in one visual representation of the audio data of an editing operation in another visual representation. Furthermore, the combined visual representations allow for a single audio editor having benefits of multiple separate audio editors.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
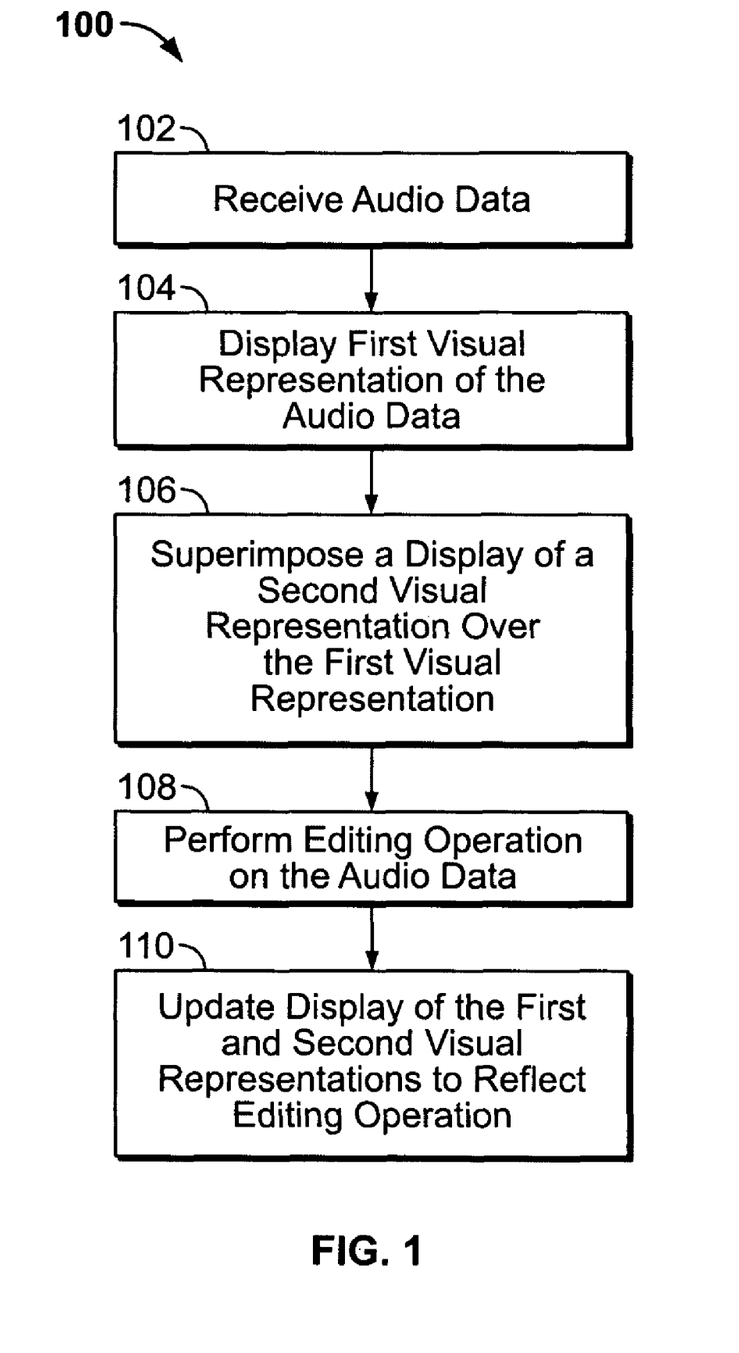
FIG. 1 shows an example process for displaying visual representations of audio data.

FIG. 1 shows an example process 100 for displaying visual representations of audio data. For convenience, the process will be described with reference to a computer system that performs the process. The computer system receives audio data (step 102). The audio data is received, for example, as part of an audio file. The audio file can be locally stored or retrieved from a remote location. The audio data can be received, for example, in response to a user selection of a particular audio file.

The system displays a first visual representation of the audio data (step 104). For example, a particular feature of the audio data can be plotted and displayed in a window of a graphical user interface. The first visual representation can be displayed as a frequency spectrogram, an amplitude waveform, a pan position plot, or a phase display. In some implementations, the first visual representation is a frequency spectrogram. The frequency spectrogram shows various frequencies of the audio data in the time-domain (e.g., a graphical display with time on the x-axis and frequency on the y-axis).

The system superimposes a display of a second visual representation of the audio data over the first visual representation (i.e., a composite image of the visual representations such that the first and second visual representations appeal laid over each other by some amount) (step 106). As with the first visual representation, the second visual representation can be displayed as a frequency spectrogram, an amplitude waveform, a pan position plot, or a phase display. In some implementations, the second visual representation of the audio data is an amplitude waveform. An amplitude waveform shows audio intensity in the time-domain (e.g., a graphical display with time on the x-axis and intensity on the y-axis). In some implementations, the amplitude waveform is represented by an outline of the waveform only. Thus, the outline of the waveform, for example, shows the outer boundary of audio intensity with respect to time.

Figure 2:
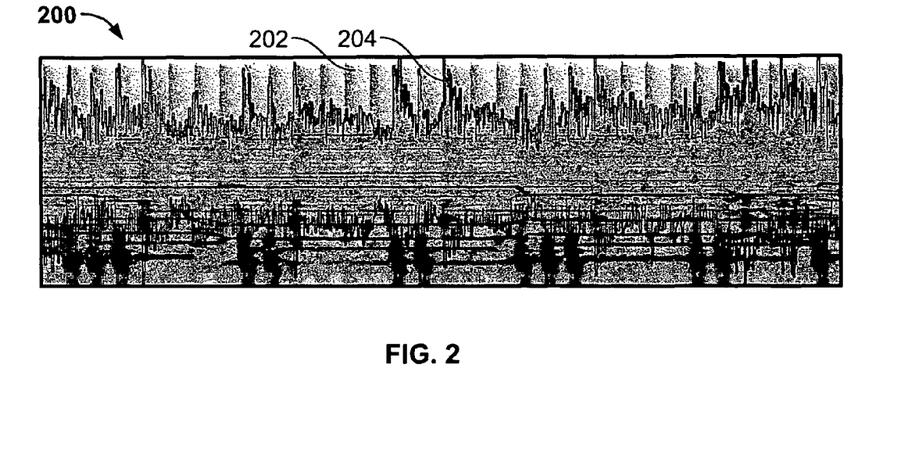
FIG. 2 shows an example display of a combined frequency spectrogram and an outline of an amplitude waveform.

FIG. 2 shows an example display 200 of a frequency spectrogram 202 and an amplitude waveform outline 204. The frequency spectrogram 202 shows the frequency components of the audio data in a frequency-time domain. Thus, the frequency spectrogram display 202 identifies the individual frequency components within the audio data at any particular point in time. With respect to the frequency spectrogram 200, the y-axis of the display 200 represents frequency, for example, in hertz. The y-axis can represent frequency in linear, logarithmic or other scales. The x-axis of the display 200 represents time, e.g., in fractions of a second.

Additionally, the frequency spectrogram 202 shows intensity for particular frequencies according to brightness or color. For example, the frequency spectrogram 202 can include varied brightness levels to indicate the intensity of particular frequencies of the audio data at that particular point in time. The intensity can be relative intensity with respect to the audio data as a whole at that point in time (e.g., a percentage of the overall audio data) or an absolute intensity (e.g., a decibel level). For each point in time, the brighter areas indicate that a greater audio intensity of the audio data is located at that frequency while dimmer areas indict less audio intensity. In some implementations, brightness is shown in grayscale having varying brightness levels to indicate intensity of the plotted audio data.

Additionally, or alternatively, the intensity of particular frequencies can be associated with a particular color. For example, colors can be assigned to represent particular intensity levels according to an absolute or relative scale. For example, using a relative scale, the color can be selected according to the percentage of the overall intensity. The number of colors used can vary depending on the number of intensity gradations as well as according to other considerations such as a determination of a particular number of visually recognizable colors. In some implementations, the colors with respect to intensity levels correspond to the ordering of colors of the visible light spectrum.

The amplitude waveform outline 204 shows the overall intensity of the audio data in the time-domain. In particular, the amplitude waveform outline 204 provides an outline indicating the outer boundary of the amplitude waveform over time. With respect to the amplitude waveform outline 204, the y-axis of the display 200 represents intensity, for example, in decibels. The x-axis of the display 200 represents time. The frequency spectrogram 202 and the amplitude waveform outline 204 share a common time axis such that the visual representations of the audio data correspond in time with each other. The amplitude waveform outline 204 can be centered with respect to the y-axis or offset from the underlying frequency spectrogram 202. In some implementations, the amplitude waveform outline 204 is provided as an overlay to the frequency spectrogram 202 while allowing a user to visually interpret both the frequency spectrogram 200 and the amplitude waveform outline 204.

In some implementations of the user interface, the user can zoom in or out of either axis of the display 200 independently, which allows, for example, the user to identify particular frequencies of the frequency spectrogram 202 over a particular time range. The user can zoom in or out of each axis to modify the scale of the axis, increasing or decreasing the range of values for the displayed visual representations. The visual representations change to correspond to the selected zooming range. For example, a user can zoom in to display the audio data corresponding to a small frequency range in frequency spectrogram 202 of only a few hertz. Alternatively, the user can zoom out in order to display the entire audible frequency range.

Figure 3:
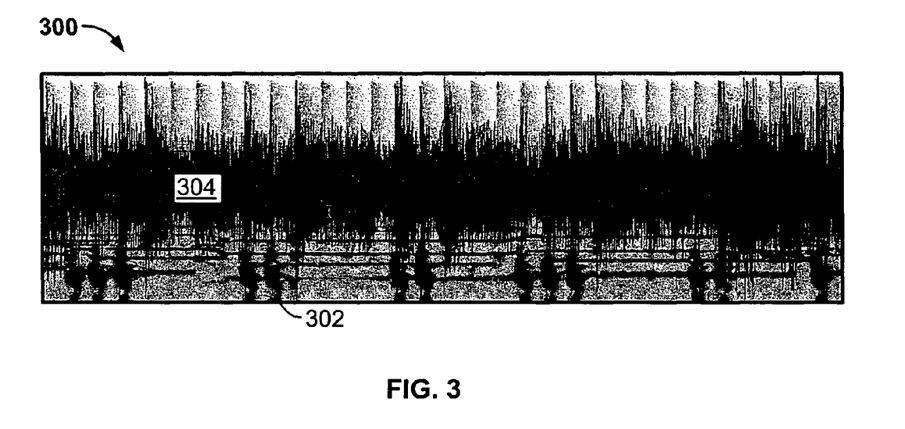
FIG. 3 shows an example display of a combined frequency spectrogram and an amplitude waveform.

FIG. 3 shows an example display 300 of a combined frequency spectrogram 302 and an amplitude waveform 304. The frequency spectrogram 302 shows the frequency components of the audio data in a frequency-time domain. The amplitude waveform 304 shows the overall intensity of the audio data in the time-domain. In the display 300, the full amplitude waveform 304 is shown instead of only an outline as in FIG. 2. However, both the amplitude waveform 304 and the frequency spectrogram 302 are visible. For example, the superimposed amplitude waveform 304 can be partially transparent such that when rendered the frequency spectrogram 302 remains visible. Alternatively, the frequency spectrogram 302 and amplitude waveform 304 can be blended together in order to present both visual representations simultaneously. Different blend tools can be used to create a desired blending effect between the two visual representations. For example, different filters used in graphics applications can be applied to increase the contrast in the superimposed region to highlight the amplitude waveform while still allowing both visual representations to be used.

As shown in FIG. 1, the system performs an editing operation on the audio data (step 108). In some implementations, the user interface includes one or more tools that provide access to different audio editing processes that can be performed on the audio data. The editing tools can allow a user to edit the audio data using input directly in a displayed visual representation, for example, by selecting a region within the visual representation and then performing an editing operation on audio data corresponding to the selected region.

In some implementations, the audio editing system includes preview functionality which allows the user to preview the edited audio results prior to modifying the audio data. Additionally, the system also can include an undo operation allowing the user undo performed audio edits, for example, which do not have the user intended results.

Common editing operations using frequency spectrogam and amplitude waveform visual representations include compression and equalization operations. Compression (or conversely amplification) operations modify the overall intensity of the audio data. Equalization includes performing an editing operation on one or more frequencies only. For example, a user can select a set of frequencies (e.g., as identified using a frequency spectrogram) and then modify the amplitude of the audio data corresponding to the selected set of frequencies.

The system updates the display of the first and second visual representations to reflect the performed editing operation (step 110). For example, if the user used an equalizer editing operation on a particular set of frequencies in the frequency spectrogram, the effect of the change is shown in both the frequency spectrogram and the amplitude waveform. The user can therefore determine whether a particular operation with respect to one visual representation had a detrimental effect that is visible in the other visual representation. For example, when editing particular frequencies, the user can determine if the editing operation has resulted in a clipped amplitude waveform. Clipping occurs when the overall amplitude exceeds the capacity of the audio system playing it, thus clipping may not be apparent from a visual inspection of the frequency spectrogram alone. If clipped audio data is saved, the clipping will persist even on other audio systems capable of playing at the unclipped intensity level. In some implementations, if five consecutive samples of the audio data have a maximum amplitude value, the audio data is considered clipped.

Additionally, the superimposed visual representations can be used to more precisely identify editing points, as will be described.

Particular forms of visual representations of audio data can be less precise with respect to time than other forms. For example, in a frequency spectrogram, the preciseness in the time domain is decreased when greater frequency accuracy is obtained because of the processing involved in generating a frequency spectrogram (e.g., the size of a fast Fourier transform used can increase frequency resolution while decreasing time resolution).

Figure 4A:
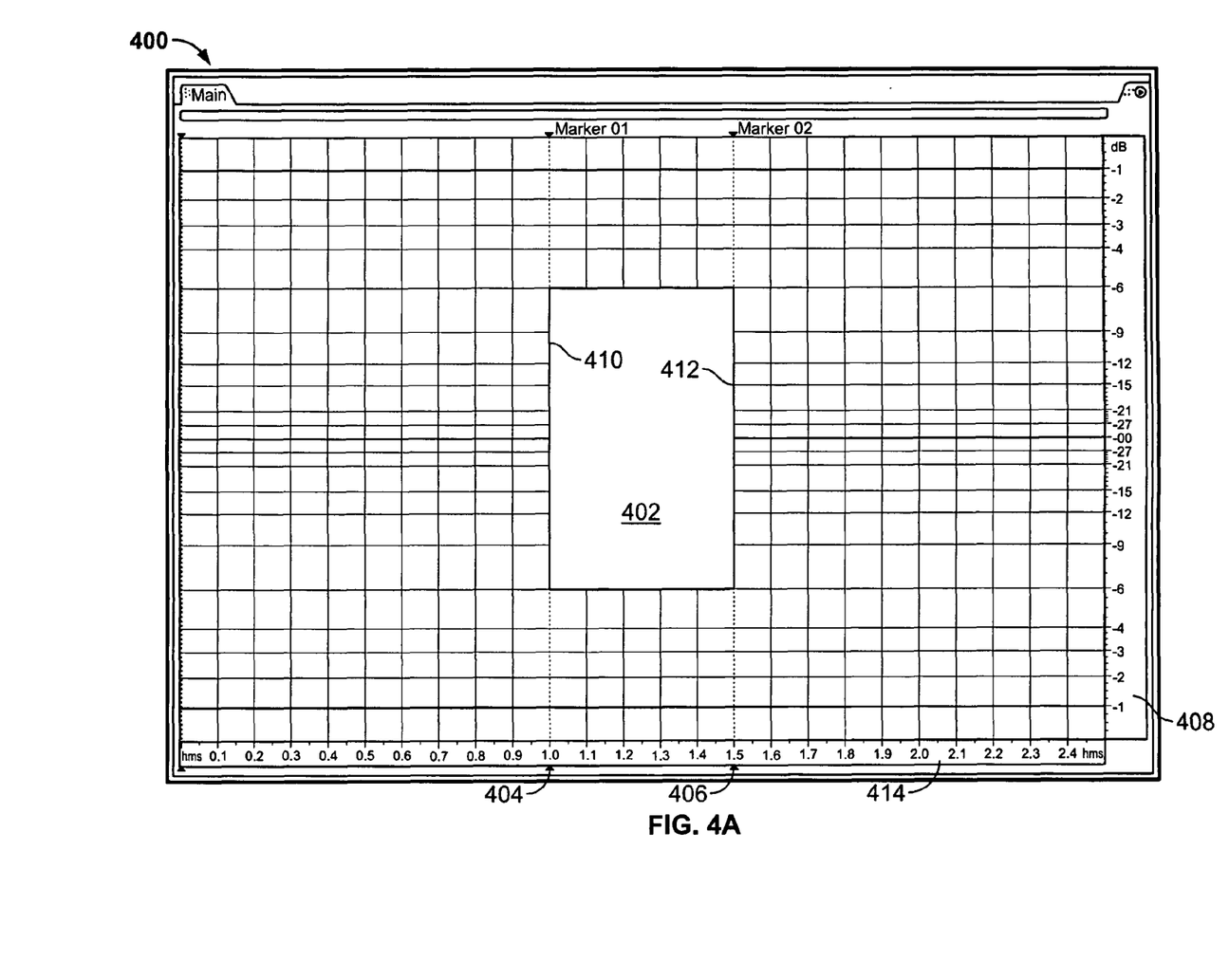
FIG. 4A shows an example display of an amplitude waveform visual representation of audio data.
Figure 4B:
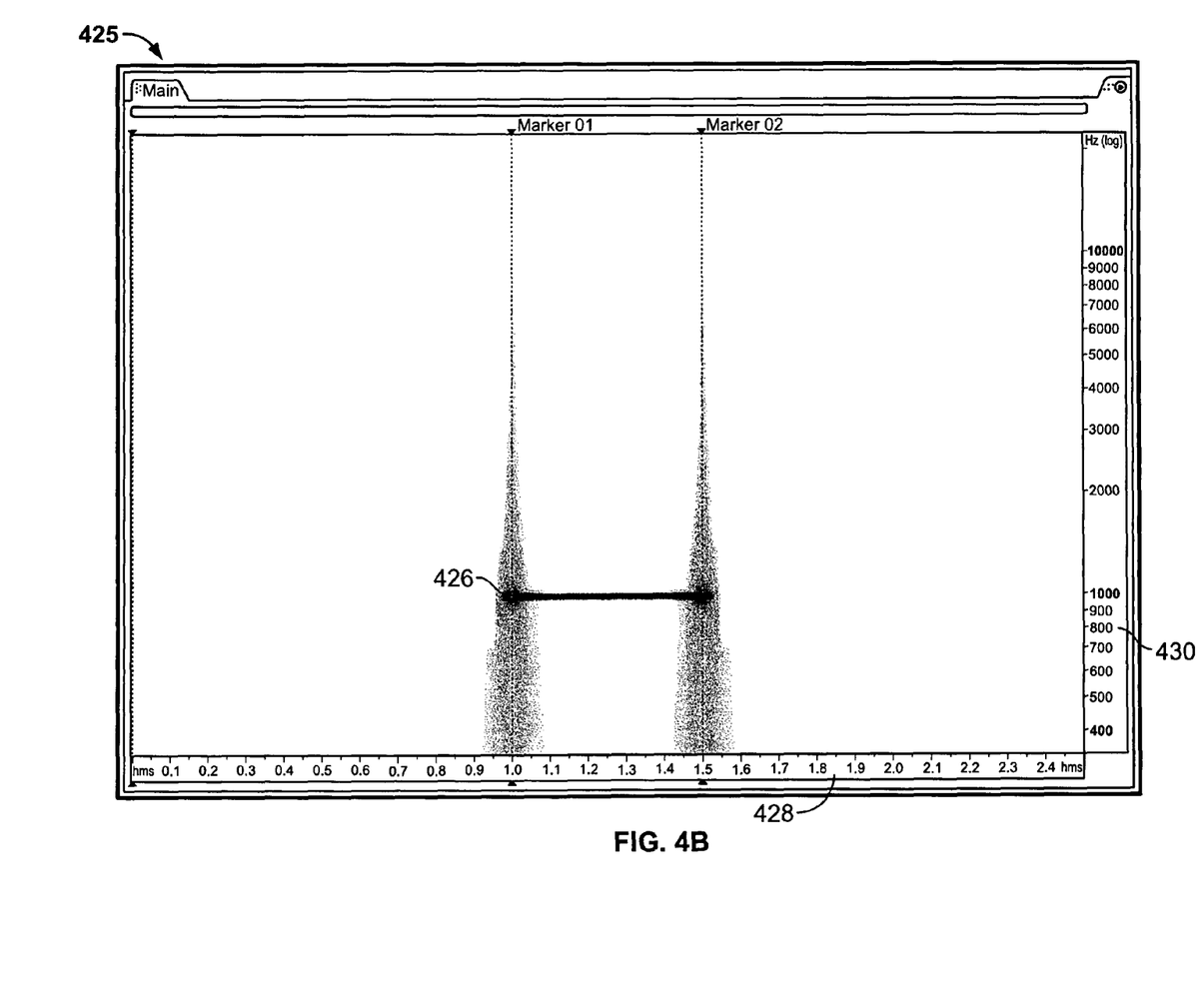
FIG. 4B shows an example display of a frequency spectrogram visual representation of the audio data of FIG. 4A.
Figure 4C:
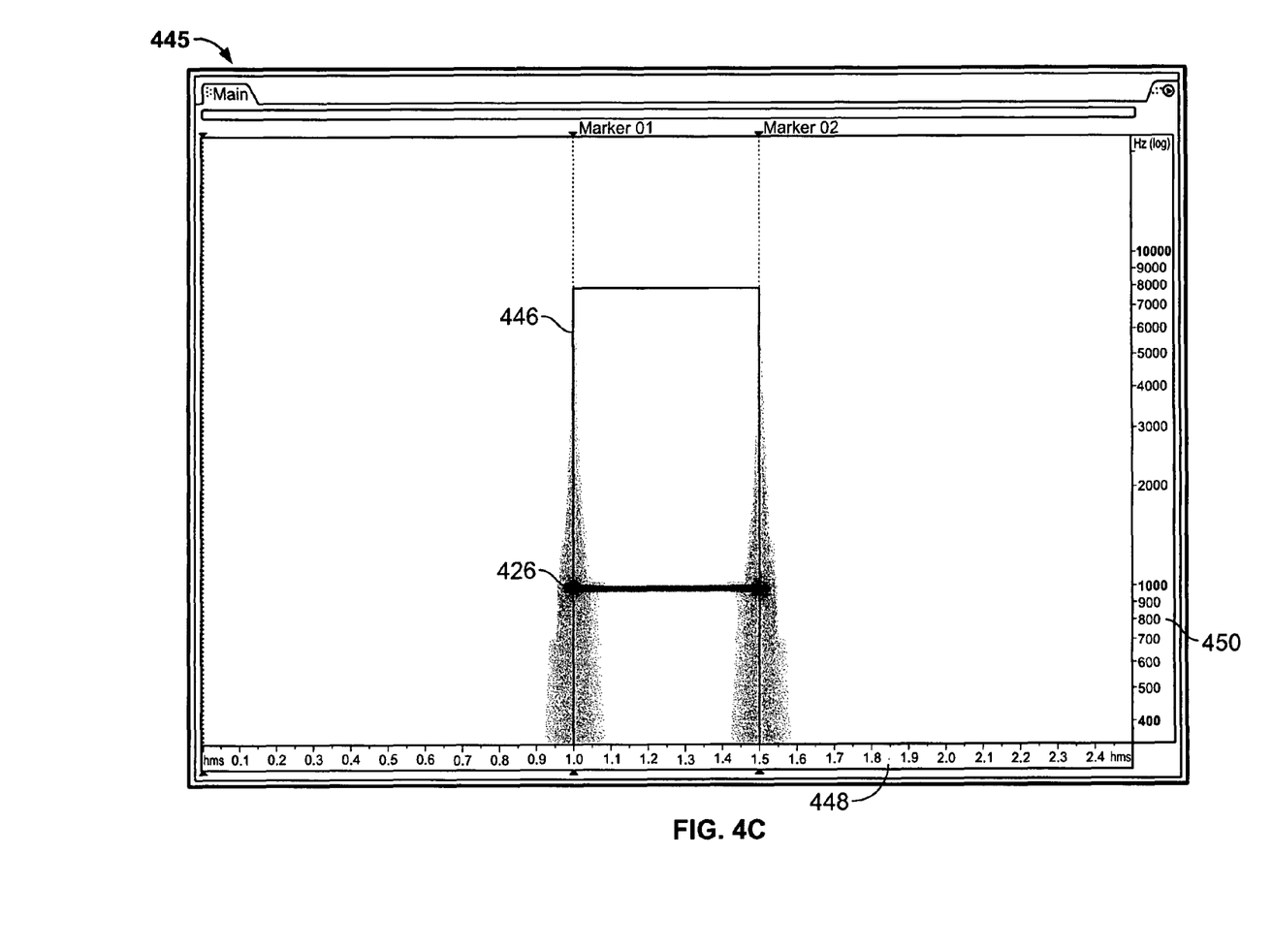
FIG. 4C shows an example display of combined frequency spectrogram and amplitude waveform of FIGS. 4A-4B.

FIGS. 4A-4C illustrate a simple example of how the superimposed visual representations can be used to more precisely identify editing points. FIG. 4A shows an example display 400 of an amplitude waveform 402 visual representation of audio data. In FIG. 4A, a sine tone at 1 kHz is shown having a duration of 500 ms. Markers 404 and 406 on time axis 414 show the start of the sine tone at 1 second and ending at 1.5 seconds. The y-axis 408 indicates the intensity of the sine tone. The edges 410 and 412 of the amplitude waveform 402 are clearly defined and aligned with the markers 404 and 406, respectively. Thus, there is no uncertainty regarding the start and end points of the sine tone.

FIG. 4B shows an example display 425 of a frequency spectrogram 426 visual representation of the audio data of FIG. 4A. In FIG. 4B, the same 1 kHz sine tone displayed in FIG. 4A is shown. The display 425 shows time along the x-axis 428 and frequency along the y-axis 430. However, as a result of the processing of the audio data to separate the audio data according to frequency, the time boundary of the signal has become blurred. Consequently, as shown in FIG. 4B, it is unclear from the frequency spectrogram 426 exactly where the sine tone begins and ends. Thus, identifying the appropriate editing points can be more difficult. For example, a user may identify t=0.96 seconds as the starting point and t=1.54 seconds as the ending point instead of the actual start and ending points, which are clearly shown in the amplitude waveform 402 of FIG. 4A.

FIG. 4C shows an example display 445 of combined frequency spectrogram 426 and amplitude waveform 402 of FIGS. 4A-4B. In particular, the display 445 shows an outline 446 of the amplitude waveform 402 superimposed over the frequency spectrogram 426. The display 445 shows a common time for both visual representations on the x-axis 448. The y-axis 450 represents frequency with respect to frequency spectrogram 426 and amplitude with respect to outline 446 of amplitude waveform 402. The outline 446 allows the user to more clearly identify the starting and stopping points of the sine tone, which were unclear in the frequency spectrogram 426 alone. Thus, the user can identify precise editing points in the frequency spectrogram 426 using information from the superimposed outline 446.

Alternatively, with audio data having multiple frequencies, the combination of frequency spectrogram and amplitude waveform can help a user more precisely define an editing region for a particular band of frequencies. For example, the frequency spectrogram allows the user to identify a very precise range of frequencies, but is less accurate with respect to time. The user can define the time range for the selected frequencies using the superimposed amplitude waveform as a guide, thereby improving editing accuracy.

In some implementations, different visual representations can be combined. For example, the frequency spectrogram can be combined with a pan position display or a phase display. The pan position display, for example, can allow the user to define a particular frequency and position of the audio data for editing.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal, that is generated to encode information for transmission to suitable receiver apparatus for execution by a computer. The computer-readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

Figure 5:
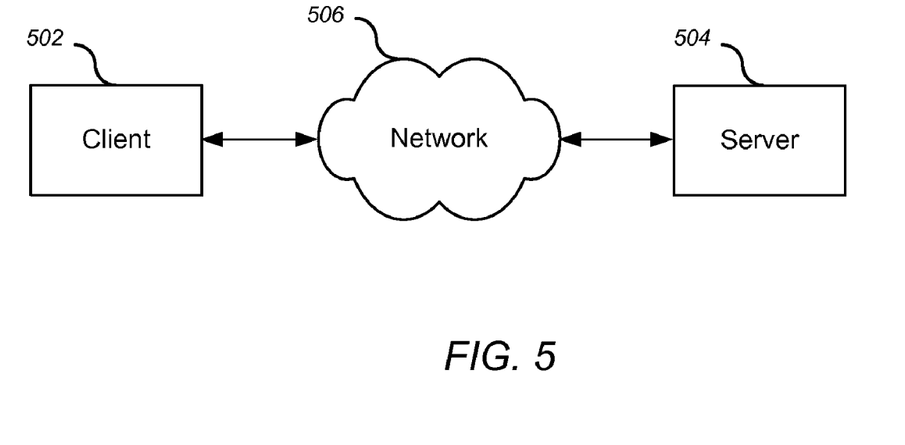
FIG. 5 is an example computing system.

The computing system can include clients and servers. A client 502 and server 504 are generally remote from each other and typically interact through a communication network 506 (FIG. 5). The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving audio data; and
   identifying editing points including displaying, on a display device, a composite image representing the audio data, the composite image combining a first representation of a first feature of the audio data and a distinct second representation of a different second feature of the audio data, each representation being visible in the composite image, the representations appearing in the composite image as if laid one over the other to identify the editing points, wherein the first representation of the first feature and the second representation of the second feature are each of a different representation type selected from the group including a frequency spectrogram, an amplitude waveform, a pan position plot, and a phase display, and wherein the first representation of the first feature of the audio data includes a first set of editing points and the second representation of the second feature of the audio data includes a second set of editing points, and wherein the second set of editing points are more visible than the first set of editing points.

2. The method of claim 1, where the first and second representations of the audio data are displayed with respect to a shared axis.

3. The method of claim 1, where the shared axis is a time axis.

4. The method of claim 1, where the first representation is a frequency spectrogram.

5. The method of claim 1, where the second representation represents an amplitude waveform.

6. The method of claim 5, where the amplitude waveform is represented with a single pixel width line defining the outer shape of the amplitude waveform.

7. The method of claim 1, where the composite image highlights the region composed of the first and second representations.

8. The method of claim 1, further comprising:
editing the audio data based on at least the identified editing points.

9. The method of claim 8, where editing the audio data comprises:
receiving an input to perform an editing operation on the audio data; and
performing the editing operation and updating the displayed audio data to reflect the result of the editing operation.

10. A computer program product, encoded on a tangible program carrier, operable to cause data processing apparatus to perform operations comprising:
receiving audio data; and
identifying editing points including displaying, on a display device, a composite image representing the audio data, the composite image combining a first representation of a first feature of the audio data and a distinct second representation of a different second feature of the audio data, each representation being visible in the composite image, the representations appearing in the composite image as if laid one over the other to identify the editing points, wherein the first representation of the first feature and the second representation of the second feature are each of a different representation type selected from the group including a frequency spectrogram, an amplitude waveform, a pan position plot, and a phase display, and wherein the first representation of the first feature of the audio data includes a first set of editing points and the second representation of the second feature of the audio data includes a second set of editing points, and wherein the second set of editing points are more visible than the first set of editing points.

11. The computer program product of claim 10, where the first and second representations of the audio data are displayed with respect to a shared axis.

12. The computer program product of claim 10, where the shared axis is a time axis.

13. The computer program product of claim 10, where the first representation is a frequency spectrogram.

14. The computer program product of claim 10, where the second representation represents an amplitude waveform.

15. The computer program product of claim 14, where the amplitude waveform is represented with a single pixel width line defining the outer shape of the amplitude waveform.

16. The computer program product of claim 10, where the composite image highlights the region composed of the first and second representations.

17. The computer program product of claim 10, further comprising:
editing the audio data based on at least the identified editing points.

18. The computer program product of claim 17, where editing the audio data comprises:
receiving an input to perform an editing operation on the audio data;
performing the editing operation and updating the displayed audio data to reflect the result of the editing operation.

19. A system comprising:
a user interface device; and
one or more computers operable to interact with the user interface device and to:
receiving audio data; and
identifying editing points including displaying a composite image representing the audio data, the composite image combining a first representation of a first feature of the audio data and a distinct second representation of a different second feature of the audio data, each representation being visible in the composite image, the representations appearing in the composite image as if laid one over the other to identify the editing points, wherein the first representation of the first feature and the second representation of the second feature are each of a different representation type selected from the group including a frequency spectrogram, an amplitude waveform, a pan position plot, and a phase display, and wherein the first representation of the first feature of the audio data includes a first set of editing points and the second representation of the second feature of the audio data includes a second set of editing points, and wherein the second set of editing points are more visible than the first set of editing points.

20. The system of claim 19, wherein the one or more computers comprise a server operable to interact with the user interface device through a data communication network, and the user interface device is operable to interact with the server as a client.

21. The system of claim 20, wherein the user interface device comprises a personal computer running a web browser or a mobile telephone running a WAP browser.

22. The system of claim 19, wherein the one or more computers comprises one personal computer, and the personal computer comprises the user interface device.

23. The system of claim 19, where the first and second representations of the audio data are displayed with respect to a shared axis.

24. The system of claim 19, where the shared axis is a time axis.

25. The system of claim 19, where the first representation is a frequency spectrogram.

26. The system of claim 19, where the second representation represents an amplitude waveform.

27. The system of claim 26, where the amplitude waveform is represented with a single pixel width line defining the outer shape of the amplitude waveform.

28. The system of claim 19, where the composite image highlights the region composed of the first and second representations.

29. The system of claim 19, further operable to:
edit the audio data based on at least the identified editing points.

30. The system of claim 29, where editing the audio data comprises:
receiving an input to perform an editing operation on the audio data; and
performing the editing operation and updating the displayed audio data to reflect the result of the editing operation.

* * * * *